United States Patent [19]

Di Ruocco et al.

[11] Patent Number: 5,395,872
[45] Date of Patent: Mar. 7, 1995

[54] STRUCTURAL ADHESIVE BASED ON AN ACRYLIC REACTANT

[75] Inventors: Vittorio Di Ruocco; Fabio Garbassi, both of Novara, Italy

[73] Assignee: Ministero Dell'Universita' e Della Ricerca Scientifica e Tecnologica, Rome, Italy

[21] Appl. No.: 258,364

[22] Filed: Jun. 10, 1994

Related U.S. Application Data

[63] Continuation of Ser. No. 913,013, Jul. 14, 1992, abandoned.

[30] Foreign Application Priority Data

Jul. 24, 1991 [IT] Italy .............................. MI91A02037

[51] Int. Cl.$^6$ .......................... C08K 5/07; C08L 61/20
[52] U.S. Cl. .................................... 524/284; 524/294; 524/347; 524/348; 525/157; 525/158; 525/163; 525/240; 525/519
[58] Field of Search ............... 525/154, 157, 158, 163, 525/240, 519; 524/284, 294, 347, 348

[56] References Cited

U.S. PATENT DOCUMENTS

| | | | |
|---|---|---|---|
| 4,113,792 | 9/1978 | Pastor et al. | 260/834 |
| 4,118,436 | 10/1978 | Craven | 260/826 |
| 4,400,333 | 8/1983 | Neefe | 264/2.7 |
| 4,515,917 | 5/1985 | Yamamoto et al. | 524/178 |
| 4,689,085 | 8/1987 | Plueddemann | 106/287.14 |

FOREIGN PATENT DOCUMENTS

2193863  2/1974  France .

*Primary Examiner*—James J. Seidleck
*Assistant Examiner*—Mary Critharis
*Attorney, Agent, or Firm*—Oblon, Spivak, McClelland, Maier & Neustadt

[57] ABSTRACT

Double-component acrylic adhesive compositions are disclosed, in which:
(a) the adhesive component comprises a mono-functional acrylic monomer, a chloro-sulfonated polyolefin and a crosslinker selected from difunctional silicon derivatives;
(b) the activating component is a typical aldehyde-amine condensation product.

11 Claims, No Drawings

STRUCTURAL ADHESIVE BASED ON AN ACRYLIC REACTANT

This application is a continuation of application Ser. No. 07/913,013, filed on Jul. 14, 1992, now abandoned.

The present invention relates to structural adhesives based on an acrylic reactant.

More particularly, the present invention relates to double-component structural adhesives (bonding agents) based on an acrylic reactant.

In the art, structural adhesives based on acrylic reactants are already known. They are disclosed, e.g., in U.S. Pat. Nos. 3,591,438; 3,594,451; 3,642,750; 3,203,941 and 3,890,407.

In particular in U.S. Pat. No. 3,890,407; adhesive compositions are disclosed in which the critical components and essentially constituted by chlorosulfonated polyethylene or a mixture of sulfonyl chloride with chlorinated polyethylene, a vinylic monomer and a polymerization catalyst constituted by a free-radical generator, a polymerization initiator, an adhesion promoter and an adhesive-activator component.

Among vinylic monomers, also polyol (meth)acrylic esters are included, such as ethylene glycol diacrylate or dimethacrylate, the function of which is of crosslinking the adhesive during the curing step.

The present Applicant has found now a novel class of double-component acrylic adhesives in which crosslinkers are used which are perfectly compatible with the components which constitute the same adhesives, which were never described in the past literature, with regard to this function.

Therefore, the object of the present invention are the double-component structural adhesives based on an acrylic reactant, which comprise:
(a) a first adhesive component constituted by a solution of a chlorosulfonated polymer in a mono-functional acrylic monomer containing a free-radical generator agent, a stabilizer agent, an adhesion promoter and a crosslinker selected from among silicon derivatives falling within the scope of the following general formulae:

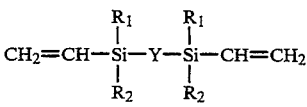

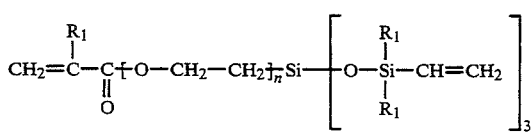

wherein:
R$_1$ represents an alkyl radical of from 1 to 4 carbon atoms,
R$_2$ represents an alkyl radical of from 1 to 4 carbon atoms or a phenyl radical,
Y represents an oxygen bridge, an amino group or an alkylene radical of from 1 to 12 carbon atoms,
n is an integer comprised within the range of from 1 to 50;
(b) a second component, which activates the adhesive component, constituted by a mixture of aldehyde-amine condensation products, in which an organic salt of a metal belonging to the first transition series, in a low oxidation state, is dissolved.

Preferred products according to the present invention falling within the scope of general formulae (I) and (II) are:
1,3-divinyltetramethyldisiloxane;
1,3-divinyl-1,3-diphenyl-1,3-dimethyldisiloxane;
1,4-divinyl-1,1,4,4-tetramethyldisilylethylene;
3-methacryloxypropyltris(vinyldimethylsiloxy)silane;
and so forth.

These products are used in amounts comprised within the range of from 0.1 to 2% by weight, relatively to the total weight of component (a).

Examples of acrylic monomers which can be used in order to manufacture the adhesives according to the present invention are:
methyl methacrylate;
ethyl methacrylate;
acrylonitrile;
methacrylonitrile;
methyl acrylate;
ethyl acrylate;
butyl methacrylate;
cyclohexyl methacrylate;
hexyl methacrylate;
lauryl methacrylate;
butyl acrylate;
cyclohexyl acrylate;
hexyl acrylate;
lauryl acrylate;
acrylamide, and
methacrylamide.

Methyl methacrylate, ethyl methacrylate and cyclohexyl methacrylate are preferred products.

The chlorosulfonated polymer used in the adhesives according to the present invention is selected from among chlorosulfonated polyolefins.

Chlorosulfonated polyethylene is the preferred product, although chlorosulfonated copolymers of ethylene with small amounts of propylene or other olefins can be used as well.

Chlorosulfonated polyethylene is obtained according to techniques known in the art, by reacting linear or branched polyethylene with sulfonyl chloride or with SO$_2$ and chlorine. Such a product is manufactured by Du Pont, and is marketed by that Company under the trade name Hypalon.

As chlorosulfonated polymers, mixtures of sulfonyl chlorides with chlorinated polyethylene or chlorosulfonated polyethylene, can be alternatively used.

The sulfonyl chlorides can be selected from among (C$_1$–C$_{12}$)-alkyl-sulfonyl chlorides, such as methane- or buthane-sulfonyl chloride, (C$_6$–C$_{24}$)-aryl-sulfonyl chlorides, such as benzene- or toluene-sulfonyl chloride and hereto-atoms containing sulfonyl chlorides, such as diphenylether-4,4'-disulfonyl chloride.

The chlorosulfonated polymer is added to the acrylic monomer in amounts which may vary within wide ranges, even if using amounts comprised within the range of from 25 to 40% by weight, relatively to the total weight of component (a), may be preferred.

To the resulting mixture, an amount comprised within the range of from 0.1 to 2% by weight, relatively to the total weight of component (a), is added of a stabilizer agent selected from among quinones and hydroquinones, such as di-hydroquinone, di-hydroquinone monomethyl ether, anthraquinone, di-tert.-butyl-p- cresol, and so forth. Di-bert.-butyl-p-cresol is the preferred stabilizer agent.

To the solution of the monofunctional acrylic monomer, adhesion promoters are added in amounts of up to 20% by weight, relatively to the total weight of component (a). They are selected from the class of unsaturated mono- and di-carboxy acids. Methacylic acid is the preferred product.

The last additive to the first adhesive component is represented by the free-radical generator agent.

Free-radical generator agents are known from the pertinent technical literature, and are described in "Free Radicals in Solution", C. Walling, J. Wiley & Sons, New York, 1957 and in "The Chemistry of Organic Film Formers", D. H. Solomon, J. Wiley & Sons, New York, 1967, page 135. Preferred free-radical generator agents are organic peroxides and hydroperoxides, such as cumene hydroperoxide, benzoyl peroxide, lauroyl peroxide, methylethylketone hydroperoxide, cyclohexanone hydroperoxide, and so forth, used in amounts comprised within the range of from 0.1 to 2% by weight, relatively to the total weight of component (a).

The adhesive component disclosed hereinabove shows a Brookfield viscosity comprised within the range of from 10,000 to 60,000 cP.

The second component, i.e., the adhesive activator component, comprises an activator agent selected from a mixture of aldehyde-amine condensation products, in which an activation promoter is dissolved, which is constituted by an organic salt of a metal belonging to the first transition series, in a low oxidation state.

Several aldehydes and primary amines are suitable for preparing the adhesive activating component.

The aldehydes preferably are of aliphatic nature, and contain radical of from 1 to 12 carbon atoms. Examples of aldehydes which can be used in order to prepare the activator component for the adhesive according to the present invention are: acetaldehyde, butyraldehyde, propionaldehyde, cyclopentanal, hexanal, cyclohexanal, hydrocynnamaldehyde, heptanal, decanal, dodecanal, and so forth.

Any aliphatic or aromatic primary amines of up to 18 carbon atoms, can be used in order to prepare the activators of the present invention.

Examples of such amines are: ethylamine, butylamine, pentylamine, cyclopentylamine, hexylamine, cyclohexylamine, octylamine, decylamine, dodecylamine, hexadecylamine, octadecylamine, aniline, tolyl amines and xylyl amines, and so forth.

Preferred products for preparing the adhesive activator component are those butyraldehyde-aniline condensation products, which are available on the market under the trade name VAMAC 808, ex Du Pont.

The activation promoter agent is an organic salt of a metal belonging to the first transition series, in a low oxidation state, soluble in aldehyde-amine condensation products. It is generally used in concentrations not higher than 0.5% by weight, relatively to the total weight of component (b).

Any metals belonging to the first transition series can be used in order to prepare the activation promoter agent; however, cobalt, nickel, copper, manganese, iron and vanadium are preferred.

Examples of organic salts useable as activation promoter are: copper saccharin salt, copper p-toluene-sulfonate, cobalt acetyl acetonate, iron lactate, iron gluconate, and so forth.

In particular, copper-(I) saccharin salt is the preferred activation promoter agent.

The structural adhesives according to the present invention are characterized by:
  a setting time, measured as the time beyond which two specimens cannot be separated any longer from each other by means of a shear stress, shorter than 90 seconds:
  a shear strength, measured according to ASTM D 1002-72, comprised within the range of from 15 to 25 N/mm$^2$.

Said adhesives are used with the primer-technique, according to which the adhesive component is applied onto a piece to be bonded, and the activator component is applied to the other piece to be bonded.

Furthermore, the adhesives according to the present invention can be used, beside room temperature, also at higher temperatures, both during the setting step and during the bonded part operating step.

The adhesives according to the present invention can be used on either porous or smooth surfaces, without requiring any mandatory pre-treatments of the surfaces they have to be applied to.

Materials which can be bonded by means of the adhesive composition according to the present invention are steel, aluminum, copper, brass, polar polymeric materials, wood, glass, paper, pre-painted surfaces, and so forth.

In order to better understand the present invention, and to practice it, some illustrative, non-limitative Examples are reported in the following.

EXAMPLE 1

34.5 g of ethyl methacrylate is added to a mixture constituted by: 30 g of chlorosulfonated polyethylene (known under the trade name Hypalon 20), 47 mmol of methanesulfonyl chloride per 100 g of polymer, 33.8 g of methacrylic acid and 1 g of divinyltetramethyldisiloxane (DVTMS).

The resulting mixture is stirred at room temperature, until all polymer is dissolved (required time: approximately 24 hours). The resulting paste-like mixture is completed by the addition of 0.3 g of di-bert.-butyl-p-cresol and 0.4 g of cumene hydroperoxide. The resulting paste shows a Brookfield viscosity of 34,000 mPa$\times$s.

Then, steel specimens of 120$\times$25$\times$1.5 mm are prepared by being a 4-minute pickling in a solution containing 10% by weight of $H_2SO_4$, 10% of $HNO_3$, and 80% of water.

On one specimen, a thin layer of paste is applied to a thickness of about 0.5 mm; and on another one, the activator is spread, which is constituted by the condensation product of butyraldehyde and aniline, containing 0.01% by weight of copper saccharin salt.

The specimens to be bonded are coupled with each other, and are submitted to a pressure of about 2N/m$^2$.

The shear strength is measured by means of an Instrom TM SM/10 Tester according to ASTM D 1002 72 (1982), with the shear rate of 4 mm/min being applied after 24 hours at room temperature, plus 1 hour at 100° C., after specimens coupling.

The peel strength is measured by means of an Instrom TM-SM Tester according to ASTM D 1876, with the peel rate being kept at 10 cm/min, and applied after a 2-weeks storage of bonded specimens at room temperature.

The following results are obtained:

setting time: 20 seconds;
shear strength: 21N/mm²;
peel strength: 5.5 kg/cm.

EXAMPLE 2

40 g of ethyl methacrylate is added to a mixture constituted by 35 g of chlorosulfonated polyethylene of Example 1, 22.3 g of methacrylic acid and 1 g of divinyltetramethyldisiloxane (DVTMS). The resulting mixture is stirred inside a reaction vessel at room temperature, until all polymer is dissolved, which requires 24 hours.

The resulting adhesive paste is completed by the addition of 0.3 g of di-tert.-butyl-p-cresol and 0.4 g of cumene hydroperoxide. The Brookfield viscosity of the resulting paste is of 80,000 mPa×s.

The specimens are bonded according to the method disclosed in Example 1. The following results are obtained:
setting time: 30 seconds;
shear strength: 21N/mm²;
peel strength: 5.4 kg/cm.

EXAMPLE 3

Example 1 was repeated, except for 1,3-divinyl-1,3-diphenyl-1,3-dimethyldisiloxane being used instead of DVTMS. The following results were obtained:
setting time: 30 seconds;
shear strength: 21.2N/mm²;
peel strength: 5.0 kg/cm.

EXAMPLE 4

Example 1 was repeated, except for 1,4-divinyl-1,1,4,4-tetramethyldisilyl-ethylene being used instead of DVTMS. The following results were obtained:
setting time: 30 seconds;
shear strength: 20.9N/mm²;
peel strength: 4.5 kg/cm.

EXAMPLE 5

Example 1 was repeated, except for 3-methacryloxy-propyl-tris(vinyldimethylsiloxy)silane being used instead of DVTMS. The following results were obtained:
setting time: 45 seconds;
shear strength: 18.2N/mm²;
peel strength: 3.0 kg/cm.

EXAMPLE 6

Example 1 was repeated without using crosslinkers. The following results were obtained:
setting time: 6 minutes;
shear strength: 12.0N/mm²;
peel strength: <1.0 kg/cm.

We claim:

1. Double-component structural adhesives, based on an acrylic reactant, which comprise:

(a) a first adhesive component constituted by a solution of a chlorosulfonated polymer in a mono-functional acrylic monomer containing a free-radical generator agent, a stabilizer agent, an adhesion promoter and a crosslinker selected from among silicon derivatives falling within the scope of the following general formulae:

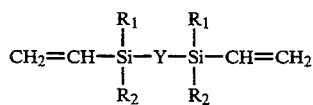

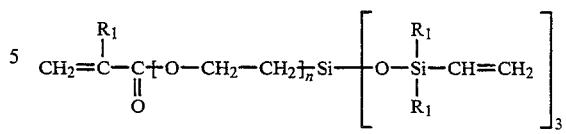

wherein:
$R_1$ represents an alkyl radical of from 1 to 4 carbon atoms,
$R_2$ represents an alkyl radical of from 1 to 4 carbon atoms or a phenyl radical,
Y represents an oxygen bridge, an amino group or an alkylene radical of from 1 to 12 carbon atoms,
n is an integer comprised within the range of from 1 to 50;

(b) a second component, which activates the adhesive component, constituted by a mixture of aldehyde-amine condensation products, in which an organic salt of a metal belonging to the first transition series, in a low oxidation state, is dissolved.

2. Adhesives according to claim 1, in which the crosslinkers having the general formulae (I) and (II) are used in amounts comprised within the range of from 0.1 to 2% by weight, relatively to the total weight of component (a).

3. Adhesives according to claim 1 or 2, in which the chlorosulfonated polymer is selected from among chlorosulfonated polyolefins.

4. Adhesives according to claim 1 or 2, in which the chlorosulfonated polymer is added to the acrylic monomer in amounts comprised within the range of from 25 to 40% by weight, relatively to the total weight of component (a).

5. Adhesives according to claim 1 or 2, in which the stabilizer agent is selected from among quinones and hydroquinones, and is added in amounts comprised within the range of from 0.1 to 2% by weight, relatively to the total weight of component (a).

6. Adhesives according to claim 1 or 2, in which the adhesion promoter is selected from the class of unsaturated mono- and di-carboxy acids and is added in amounts of up to 20% by weight relatively to the total weight of component (a).

7. Adhesives according to claim 1 or 2, in which the free-radical generator agent is selected from among organic peroxides and hydroperoxides, and is added in amounts comprised within the range of from 0.1 to 2% by weight, relatively to the total weight of component (a).

8. Adhesives according to claim 1 or 2, in which the mixture of aldehyde-amine condensation products is constituted by butyraldehyde-aniline condensation product.

9. Adhesives according to claim 1 or 2, in which the activation promoter agent is used in concentrations not higher than 0.5% by weight, relatively to the total weight of component (b).

10. Structural adhesives according to claim 1 or 2, having:
a setting time, measured as the time beyond which two specimens cannot be separated any longer from each other by means of a shear stress, shot-her than 90 seconds:
a shear strength, measured according to ASTM D 1002-72, comprised within the range of from 15 to 25N/mm².

11. A process for bonding surfaces of steel, aluminum, copper, brass, polar polymeric materials, wood, glass, paper or pre-painted surfaces which comprises applying to opposing surfaces the double-component structural adhesive of claim 1 or 2.

* * * * *